US012739065B2

(12) United States Patent
Xiao et al.

(10) Patent No.: US 12,739,065 B2
(45) Date of Patent: Sep. 15, 2026

(54) METHODS AND APPARATUSES FOR MULTI-TRP TRANSMISSION

(71) Applicant: Lenovo (Beijing) Limited, Beijing (CN)

(72) Inventors: Lingling Xiao, Beijing (CN); Bingchao Liu, Beijing (CN); Chenxi Zhu, Beijing (CN); Wei Ling, Beijing (CN); Yi Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 322 days.

(21) Appl. No.: 18/287,439

(22) PCT Filed: May 10, 2021

(86) PCT No.: PCT/CN2021/092812

§ 371 (c)(1), (2) Date: Oct. 18, 2023

(87) PCT Pub. No.: WO2022/236591

PCT Pub. Date: Nov. 17, 2022

(65) Prior Publication Data

US 2025/0286669 A1 Sep. 11, 2025

(51) Int. Cl.

*H04L 1/1867* (2023.01)
*H04L 5/00* (2006.01)

(Continued)

(52) U.S. Cl.

CPC ............ *H04L 1/189* (2013.01); *H04L 5/0035* (2013.01); *H04L 5/0051* (2013.01); *H04L 1/08* (2013.01); *H04W 36/00692* (2023.05)

(58) Field of Classification Search

CPC ......... H04L 5/00; H04L 5/003; H04L 5/0032; H04L 5/0035; H04L 1/12; H04L 1/16;

(Continued)

(56) References Cited

U.S. PATENT DOCUMENTS

2020/0195404 A1* 6/2020 Lee ....................... H04W 52/16
2021/0168006 A1* 6/2021 Chen .................. H04L 27/2614

(Continued)

FOREIGN PATENT DOCUMENTS

CN 111490861 A 8/2020
CN 112136288 A 12/2020
WO 2020063805 A1 4/2020

OTHER PUBLICATIONS

PCT/CN2021/092812 , "International Preliminary Report on Patentability", PCT Application No. PCT/CN2021/092812, Nov. 23, 2023, 4 pages.

(Continued)

*Primary Examiner* — Warner Wong

(74) *Attorney, Agent, or Firm* — FIG. 1 Patents

(57) ABSTRACT

Embodiments of the present disclosure relate to a method and apparatus for multiple transmit-receive points (multi-TRP) transmission. According to an embodiment of the present disclosure, a method can include: receiving first configuration information for uplink phase tracking reference signal (PT-RS) and second configuration information indicating a plurality of sounding reference signal (SRS) resource sets, wherein each of the plurality of SRS resource sets is associated with at least one physical uplink shared channel (PUSCH) repetition; for each PUSCH repetition, determining a number of PT-RS ports for transmitting the uplink PT-RS; and transmitting two or more PUSCH repetitions. Embodiments of the present disclosure can resolve the issues caused by the imbalance numbers of PT-RS ports between different TRPs.

20 Claims, 4 Drawing Sheets

(51) Int. Cl.
*H04L 1/08* (2006.01)
*H04W 36/00* (2009.01)

(58) Field of Classification Search
CPC ......... H04L 1/18; H04L 1/1867; H04L 1/189; H04L 25/0226; H04W 36/00692; H04W 92/00
See application file for complete search history.

(56) References Cited

U.S. PATENT DOCUMENTS

2022/0030620 A1* 1/2022 Cirik ..................... H04W 16/28
2022/0225362 A1* 7/2022 Yi ........................... H04L 1/189
2022/0239410 A1* 7/2022 Lim .................. H04W 72/0446
2022/0361224 A1* 11/2022 Cirik ..................... H04W 72/23
2023/0076139 A1* 3/2023 Muruganathan ...... H04W 16/28
2023/0085874 A1* 3/2023 Khoshnevisan ...... H04L 5/0023 370/329
2023/0232415 A1* 7/2023 Kim .................... H04W 72/232 370/329
2023/0246779 A1* 8/2023 Yuan ..................... H04L 5/0035 370/329
2023/0261836 A1* 8/2023 Liu ....................... H04L 5/0094 370/329
2023/0371042 A1* 11/2023 Mei ....................... H04L 5/0051
2024/0048320 A1* 2/2024 Sun ....................... H04L 5/0051
2024/0056341 A1* 2/2024 Sun ......................... H04W 8/24
2024/0080156 A1* 3/2024 Gao ...................... H04L 5/0035
2024/0098740 A1* 3/2024 Muruganathan ...... H04L 5/0053
2024/0106604 A1* 3/2024 Mei ....................... H04L 5/0051
2024/0178939 A1* 5/2024 Davydov ............. H04L 5/0044

OTHER PUBLICATIONS

PCT/CN2021/092812 , “International Search Report and Written Opinion”, PCT Application No. PCT/CN2021/092812, Feb. 15, 2022, 6 pages.
Samsung , “Enhancements on Multi-TRP for PDCCH, PUCCH and PUSCH”, 3GPP TSG RAN WG1 #104b-e, R1-2103222, e-Meeting [retrieved Dec. 20, 2023]. Retrieved from the Internet <https://www.3gpp.org/ftp/tsg_ran/WG1_RL1/TSGR1_104b-e/Docs>, Apr. 2021, 15 pages.

* cited by examiner

METHODS AND APPARATUSES FOR MULTI-TRP TRANSMISSION

TECHNICAL FIELD

Embodiments of the present application generally relate to wireless communication technology, and in particular to a method and an apparatus for multiple transmit-receive point (multi-TRP) transmission.

BACKGROUND

Multi-TRP transmission has been introduced into New Radio (NR). In NR Rel-17, it is proposed to identify and specify features to improve reliability and robustness for channels besides a physical downlink shared channel (PDSCH), e.g., physical downlink control channel (PDCCH), physical uplink shared channel (PUSCH), and physical uplink control channel (PUCCH), using multiple TRPs and/or multi-panel, with Rel-17 reliability features.

For a PUSCH transmission towards multiple TRPs, a phase tracking reference signal (PT-RS) may also be transmitted. The main purposes of PT-RS may include: 1) correcting the interference caused by the phase error of the crystal oscillator by the transmitter and receiver; and 2) suppressing phase noise and common phase errors in the frequency domain (especially for high frequency millimeter waves). However, there is no limitation on the number of PT-RS ports for transmitting the PT-RS between different TRPs. That is, the number of PT-RS ports for transmitting the PT-RS towards different TRPs may be different. The imbalance on numbers of PT-RS ports between different TRPs may result in some issues, for example, how to determine a size of a transport block (TB) of the PUSCH repetition to different TRPs, how to determine the PT-RS power for transmitting the PT-RS to different TRPs, and so on.

Given the above, it is desirable to provide improved technology for multi-TRP PUSCH transmission, which can resolve the issues caused by the imbalance numbers of PT-RS ports between different TRPs.

SUMMARY OF THE APPLICATION

Some embodiments of the present application provide a technical solution for multi-TRP transmission.

According to some embodiments of the present application, a method may include: receiving first configuration information for uplink PT-RS and second configuration information indicating a plurality of sounding reference signal (SRS) resource sets, wherein each of the plurality of SRS resource sets is associated with at least one PUSCH repetition; for each PUSCH repetition, determining a number of PT-RS ports for transmitting the uplink PT-RS; and transmitting two or more PUSCH repetitions.

In some embodiments, the numbers of PT-RS ports for PUSCH repetitions associated with different SRS resource sets are the same.

In an embodiment, the PUSCH repetition is a codebook based PUSCH repetition, and the method may further include: receiving downlink control information (DCI) or a configured grant (CG) configuration including a plurality of transmitted precoding matrix indicator (TPMI) fields (e.g., precoding information and number of layers as specified in 3GPP standard documents). The, wherein a TPMI (e.g., precoding information or precoding matrix) indicated by each TPMI field is associated with one or more SRS resources in a corresponding SRS resource set of the plurality of SRS resource set.

In another embodiment, each TPMI field indicates a precoding matrix for at least one PUSCH repetition associated with the corresponding SRS resource set, and wherein the precoding matrix indicated by different TPMI fields is associated with a same number of PT-RS ports.

In yet another embodiment, the PUSCH repetition is a non-codebook based PUSCH repetition, and the method may further include: receiving DCI or a CG configuration including a plurality of SRI fields (e.g., SRS resource indicator as specified in 3GPP standard documents), wherein each SRI field indicates one or more SRS resources in a corresponding SRS resource set of the plurality of SRS resource sets.

In yet another embodiment, each SRI field indicates the one or more SRS resources used for at least one PUSCH repetition associated with the corresponding SRS resource set, and wherein the one or more SRS resources indicated by different SRI fields are associated with a same number of PT-RS ports.

In some other embodiments, the numbers of PT-RS ports for PUSCH repetitions associated with different SRS resource sets are different.

In an embodiment, the method may further include: determining a size of a transport block (TB) of each PUSCH repetition based on a maximum number of PT-RS ports among all of the two or more PUSCH repetitions; and/or determining a PT-RS power ratio of each PUSCH repetitions based on a maximum number of PT-RS ports among all of the two or more PUSCH repetitions.

In another embodiment, the number of PT-RS ports for at least one PUSCH repetition associated with an SRS resource set is one, and the number of PT-RS ports for the other at least one PUSCH repetition associated with another SRS resource set is two.

In yet another embodiment, for the at least one PUSCH repetition associated with one PT-RS port, transmitting the PT-RS using the one PT-RS port and muting the other PT-RS port.

According to some other embodiments of the present application, a method may include: transmitting first configuration information for uplink PT-RS and second configuration information indicating a plurality of SRS resource sets, wherein each of the plurality of SRS resource sets is associated with at least one PUSCH repetition; and receiving two or more PUSCH repetitions.

In some embodiments, the numbers of PT-RS ports for PUSCH repetitions associated with different SRS resource sets are the same.

In an embodiment, the PUSCH repetition is a codebook based PUSCH repetition, and the method may further include: transmitting DCI or a CG configuration including a plurality of TPMI fields (e.g., precoding information and number of layers as specified in 3GPP standard documents), wherein a TPMI indicated by each TPMI field is associated with one or more SRS resources in a corresponding SRS resource set of the plurality of SRS resource set.

In another embodiment, each TPMI field indicates a precoding matrix for at least one PUSCH repetition associated with the corresponding SRS resource set, and wherein the precoding matrix indicated by different TPMI fields is associated with a same number of PT-RS ports.

In yet another embodiment, the PUSCH repetition is a non-codebook based PUSCH repetition, and the method may further include: transmitting DCI or a CG configuration including a plurality of SRI fields (e.g., SRS resource indicator as specified in 3GPP standard documents), wherein each SRI field indicates one or more SRS resources in a corresponding SRS resource set of the plurality of SRS resource sets.

In yet another embodiment, each SRI field indicates the one or more SRS resources used for at least one PUSCH repetition associated with the corresponding SRS resource set, and wherein the one or more SRS resources indicated by different SRI fields are associated with a same number of PT-RS ports.

In some other embodiments, the numbers of PT-RS ports for PUSCH repetitions associated with different SRS resource sets are different.

In an embodiment, a size of a TB of each PUSCH repetition transmission of the two or more PUSCH repetition transmissions is determined based on a maximum number of PT-RS ports among the two or more PUSCH repetition transmissions.

Some embodiments of the present application also provide an apparatus, including: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as stated above with the at least one receiving circuitry, the at least one transmitting circuitry and the at least one processor.

Embodiments of the present application provide a technical solution for multi-TRP transmission, which can resolve the issues caused by the imbalance numbers of PT-RS ports between different TRPs, so as to better support the TB transmitted toward multi-TRP, thereby realizing reliability and robustness of the PUSCH transmission in the multi-TRP transmission.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present application are also applicable to similar technical problems; and moreover, the terminologies recited in the present application may change, which should not affect the principle of the present application.

A wireless communication system generally includes one or more base stations (BSs) and one or more UEs. Furthermore, a BS may be configured with one TRP (or panel) or more TRPs (or panels). A TRP can act like a small BS. The TRPs can communicate with each other by a backhaul link. Such backhaul link may be an ideal backhaul link or a non-ideal backhaul link. Latency of the ideal backhaul link may be deemed as zero, and latency of the non-ideal backhaul link may be tens of milliseconds and much larger, e.g. on the order of tens of milliseconds, than that of the ideal backhaul link.

In a wireless communication system, one single TRP can be used to serve one or more UEs under control of a BS. In different scenario, TRP may be called in different terms. Persons skilled in the art should understand that as the 3rd Generation Partnership Project (3GPP) and the communication technology develop, the terminologies recited in the specification may change, which should not affect the scope of the present application. It should be understood that the TRP(s) (or panel(s)) configured for the BS may be transparent to a UE.

Figure 1:
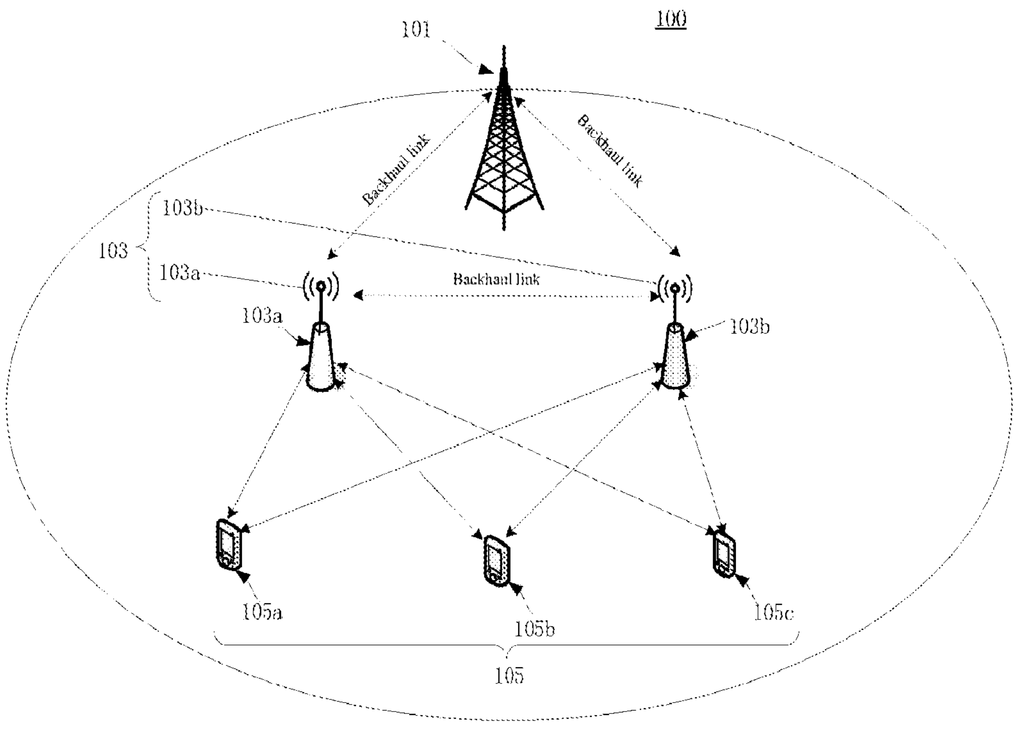
FIG. 1 is a schematic diagram illustrating an exemplary wireless communication system according to some embodiments of the present application.

FIG. 1 is a schematic diagram illustrating an exemplary wireless communication system 100 according to some embodiments of the present application.

Referring to FIG. 1, a wireless communication system 100 can include a base station (BS) 101, TRPs 103 (e.g., TRP 103*a* and TRP 103*b*), and UEs 105 (e.g., UE 105*a*, UE 105*b*, and UE 105*c*). Although only one base station 101, two TRPs 103 and three UEs 105 are shown for simplicity, it should be noted that the wireless communication system 100 may include more or less communication device(s) or apparatus in accordance with some other embodiments of the present application.

In some embodiments of the present application, a BS 101 may be referred to as an access point, an access terminal, a base, a base unit, a macro cell, a Node-B, an evolved Node B (eNB), a gNB, an ng-eNB, a Home Node-B, a relay node, or a device, or described using other terminology used in the art. The UEs 105 (for example, the UE 105*a*, the UE 105*b*, and the UE 105*c*) may include, for example, but is not limited to, a computing device, a wearable device, a mobile device, an IoT device, a vehicle, etc.

The TRPs 103, for example, the TRP 103*a* and the TRP 103*b* can communicate with the base station 101 via, for example, a backhaul link. Each of TRPs 103 can serve some or all of UEs 105. As shown in FIG. 1, the TRP 103*a* can serve some mobile stations (which include the UE 105*a*, the UE 105*b*, and the UE 105*c*) within a serving area or region (e.g., a cell or a cell sector). The TRP 103*b* can serve some mobile stations (which include the UE 105*a*, the UE 105*b*, and the UE 105*c*) within a serving area or region (e.g., a cell or a cell sector). The TRP 103*a* and the TRP 103*b* can communicate with each other via, for example, a backhaul link.

In Rel-17, PUSCH transmission with multi-TRP is specified to improve reliability and robustness. In RAN1 #103*e* meeting, two SRS resource sets used for codebook and non-codebook based PUSCH transmission were agreed, wherein one SRS resource set is used for at least one PUSCH repetition toward a TRP, and the other SRS resource set is used for at least one PUSCH repetition toward another TRP. In addition, it was also agreed that the number of layers and the number of SRS ports between two TRPs are also the same.

Figure 2:
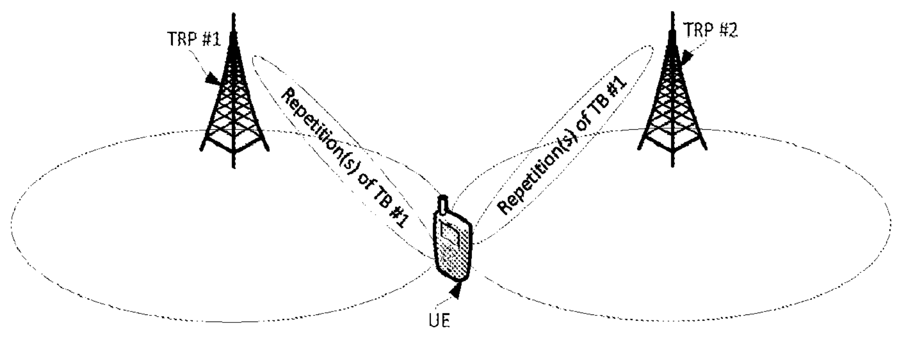
FIG. 2 is a schematic diagram illustrating an exemplary TB repetition transmission towards multiple TRPs according to some embodiments of the present application.

FIG. 2 is a schematic diagram illustrating an exemplary TB repetition transmission towards multiple TRPs according to some embodiments of the present application.

Referring to FIG. 2, it is assumed that there are two TRPs (e.g., TRP #1 and TRP #2) and two SRS resource sets (e.g., SRS resource set #1 and SRS resource set #2) are used for PUSCH transmission in the multi-TRP transmission.

A UE may transmit at least one repetition of a TB (e.g., TB #1) towards TRP #1 on at least one PUSCH transmission occasions, respectively. The UE may also transmit another at least one repetition of a TB towards TRP #2 on another at least one PUSCH transmission occasions, respectively. A repetition of a TB transmitted on a PUSCH transmission occasion may also be referred to as a PUSCH repetition. In other words, each PUSCH repetition may include the same TB.

The PUSCH repetitions may be scheduled by DCI, or correspond to a configured grant type 1 or a configured grant type 2. Each SRS resource set of the two SRS resource sets may be associated with at least one PUSCH repetition to a TRP, for example, SRS resource set #1 may be associated with at least one PUSCH repetition to TRP #1 and SRS resource set #2 may be associated with at least one PUSCH repetition to TRP #2.

For the two different SRS resource sets, the numbers of SRS ports are the same. In addition, the number of PUSCH transmission layers for each PUSCH repetition is the same.

In RAN1 #104*b* is e-meeting, the issue on PT-RS and demodulation reference signal (DMRS) association for PUSCH transmission with larger than two layers was discussed, and three options were provided to indicate the association, including:

- Option 1 (4 bits): with a second PT-RS-DMRS association field (similar to the existing field), and each field separately indicating the association between PT-RS port and DMRS port for two TRPs.
- Option 2 (2 bits): using the existing PT-RS-DMRS association field in DCI for the first TRP, and using reserved entries/bits in DMRS port indication field for the second TRP.
- Option 3 (2 bits): 1 bit most significant bit (MSB) is used to indicate PT-RS-DMRS association for the first TRP, and 1 bit least significant bit (LSB) is used to indicate PT-RS-DMRS association for the second TRP.

No matter which option will be agreed, the PT-RS and DMRS association is surely TRP specific. That is, for different TRPs, the DMRS ports associated with a same PT-RS port may be different, and the numbers of PT-RS ports for different TRP may also be different. The imbalance on the numbers of PT-RS ports between different TRPs may result in some issues, for example, how to determine the TB size of the PUSCH repetition for different TRPs, how to determine the PT-RS power ratio for different TRPs, and so on.

For example, assuming that the number of PT-RS port(s) for PUSCH repetition(s) towards a TRP is one, then the PT-RS will be transmitted on one layer of the PUSCH repetition(s) associated with the TRP. Assuming that the number of PT-RS port(s) for PUSCH repetition(s) towards another TRP is two, then the PT-RS will be transmitted on two layers of the PUSCH repetition(s) associated with the another TRP. Since the resource elements (REs) used for transmitting PT-RS will not be used for transmitting the PUSCH repetition, the available REs for transmitting PUSCH repetition for different TRPs will be different, and thus how to determine the TB size of the PUSCH repetition towards different TRPs need to be resolved. Besides, for the TRP with one PT-RS port for PT-RS transmission, the power of RES which is not used for transmitting a TB due to the PT-RS transmission using two PT-RS ports for another TRP, would be wasteful. As a result, how to determine the PT-RS power ratio for different TRPs also need to be resolved.

Given the above, embodiments of the present application aim to provide solutions for multi-TRP PUSCH transmission. Accordingly, embodiments of the present application at least can solve the above technical problems caused by the imbalance numbers of PT-RS ports between different TRPs, thereby implementing the TB repetition toward multiple TRPs. More details on embodiments of the present application will be illustrated in the following text in combination with the appended drawings.

Figure 3:
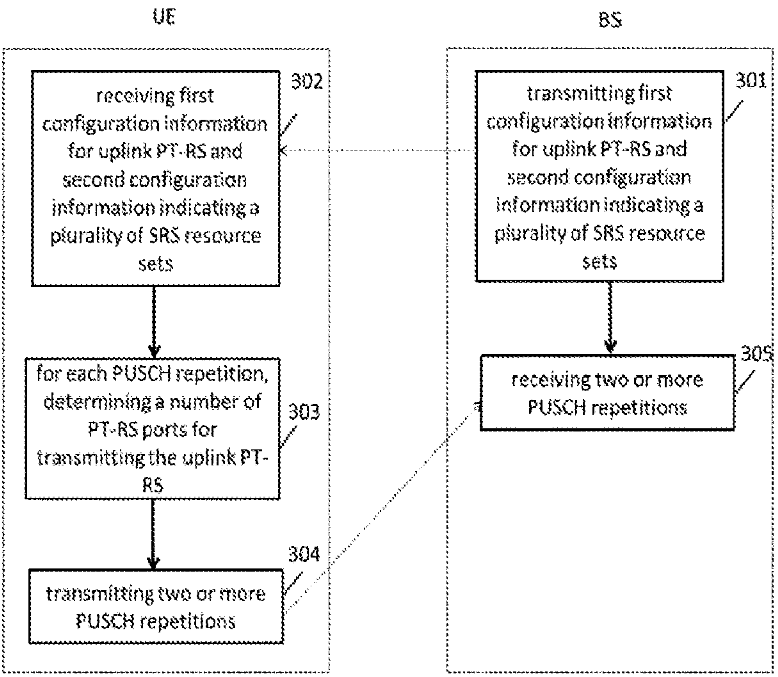
FIG. 3 illustrates a method for multi-TRP PUSCH transmission according to some embodiments of the present application.

FIG. 3 illustrates a method for multi-TRP PUSCH transmission according to some embodiments of the present application. Although the method is illustrated in a system level by a UE and a BS (e.g., UE 105 and BS 101 as illustrated and shown in FIG. 1), persons skilled in the art can understand that the method implemented in the UE and that implemented in the BS can be separately implemented and incorporated by other apparatus with the like functions.

In the exemplary method in FIG. 3, at step 301, the BS may transmit first configuration information for uplink PT-RS and second configuration information indicating a plurality of SRS resource sets to a UE. For example, the first configuration information may be "PT-RS-UplinkConfig" as specified in 3GPP standard documents and the second configuration information may be "SRS-Config" as specified in 3GPP standard documents.

In some embodiments of the present application, the first configuration information may indicate at least one of: a maximum number of configured PT-RS ports to the UE (e.g., a parameter "maxNrofPorts" as specified in 3GPP standard documents), a PUSCH to PT-RS power ratio (e.g., a parameter "PT-RS-Power" as specified in 3GPP standard documents), and time and frequency resource(s) for transmitting the PT-RS.

Each of the plurality of SRS resource sets may be associated with a TRP. in other words, each of the plurality of SRS resource sets are used for at least one PUSCH repetition towards one TRP. For example, as shown in FIG. 2, assuming that there are two TRPs in the multi-TRP transmission, SRS resource set #1 is configured for at least one PUSCH repetition to TRP #1 and SRS resource set #2 is configured for at least one PUSCH repetition to TRP #2. Each PUSCH repetition may refer to a repetition of a TB transmitted on a PUSCH transmission occasion. The PUSCH transmission occasion may refer to time and frequency resource(s) determined based on 3GPP standard documents. In other words, each PUSCH repetition may include the same TB.

Consequently, at step 302, the UE may receive the first configuration information for uplink PT-RS and the second configuration information indicating a plurality of SRS resource sets from the BS.

Then, at step 303, for each PUSCH repetition, the UE may determine a number of PT-RS ports for transmitting the uplink PT-RS.

As stated above, the imbalance on the numbers of PT-RS ports between different TRPs may result in some issues. In order to solve these issues, according to some embodiments of the present application, the BS may ensure the same number of PT-RS ports between different TRPs. In such embodiments, the numbers of PT-RS ports for PUSCH repetitions associated with different SRS resource sets are the same.

Two transmission schemes are supported for PUSCH repetition: codebook based repetition and non-codebook based repetition. As specified in 3GPP standard documents, the UE is configured with codebook based transmission when the higher layer parameter “txConfig” in “pusch-Config” is set to ‘codebook’, the UE is configured with non-codebook based transmission when the higher layer parameter txConfig is set to ‘nonCodebook’.

For the codebook based PUSCH repetition and non-codebook based PUSCH repetition, the BS may use different methods to ensure the same number of PT-RS ports between different TRPs.

According to an embodiment of the present application, for codebook based PUSCH repetition, the BS may indicate or configure only a subset of precoding matrices for PUSCH repetitions towards different TRPs such that the precoding matrices in the subset are not only associated with a same number of layers but also are associated with the same number of PT-RS ports.

Specifically, in the case that the PUSCH repetition is a codebook based PUSCH repetition, the BS may transmit DCI or a CG configuration including a plurality of TPMI fields. Consequently, the UE may receive the DCI or the CG configuration including the plurality of TPMI fields.

In some embodiments, the PUSCH repetition(s) may be dynamically scheduled by UL grant in DCI, then the TPMI fields may be included in the DCI. In some other embodiments, the PUSCH repetition(s) may correspond to a CG type 1 or CG type 2 as specified in 3GPP standard documents. In the case that the PUSCH repetition(s) corresponds to the CG type 1, the TPMI fields may be included in a CG configuration for CG type 1. In the case that the PUSCH repetition(s) corresponds to the CG type 2, the TPMI fields may be included in DCI activating the configured grant of CG type 2.

Each TPMI (e.g., precoding information or precoding matrix) indicated by each TPMI field is associated with one or more SRS resource in an SRS resource set. Therefore, each TPMI field may be associated with an SRS resource set of the plurality of SRS resource set. Since each SRS resource set is associated with a TRP, each TPMI field may be also associated with a TRP. Each TPMI field may indicate a precoding matrix for at least one PUSCH repetition associated with the corresponding SRS resource set (or the corresponding TRP). In fact, the precoding matrix may be used for all PUSCH repetition associated with the corresponding SRS resource set (or the corresponding TRP).

Taking FIG. 2 as an example, the BS may transmit DCI or a CG configuration including two TPMI fields (e.g., TPMI field #1 and TPMI field #2), and thus the UE may receive the DCI or the CG configuration including two TPMI fields. Each TMPI field may be associated with an SRS resource set (or a TRP), for example, TPMI field #1 may be associated with SRS resource set #1 (or TRP #1) and TPMI field #2 may be associated with SRS resource set #2 (or TRP #2). TPMI field #1 may indicate a TPMI index (e.g., TPMI index #1) indicating a precoding matrix for at least one PUSCH repetition associated with SRS resource set #1 (or TRP #1) and TPMI field #2 may indicate a TPMI index (e.g., TPMI index #2) indicating a precoding matrix for at least one PUSCH repetition associated with SRS resource set #2 (or TRP #2).

For the codebook based PUSCH repetition, the number the PT-RS ports for a PUSCH repetition may be determined based on the TPMI field and a UE's capability of supporting of full-coherent or partial-coherent or a non-coherent PUSCH transmission.

For a UE support full-coherent PUSCH transmission (which means that different SRS ports are coherent), the UE could be configured with ‘fullyAndPartialAndNonCoherent’, or ‘partialAndNonCoherent’, or ‘nonCoherent’ by a higher layer parameter as specified in 3GPP standard documents.

For a UE support partial-coherent PUSCH transmission (which means that some SRS ports are coherent and some SRS ports are non-coherent), the UE could be configured with only ‘partialAndNonCoherent’, or ‘nonCoherent’ codebook by a higher layer parameter as specified in 3GPP standard documents.

For a UE support non-coherent PUSCH transmission (which means any two different SRS ports are non-coherent), the UE could be configured with only ‘nonCoherent’ codebook by a higher layer parameter as specified in 3GPP standard documents.

If a UE has reported the capability of supporting full-coherent UL transmission, the UE shall expect the number of UL PT-RS ports to be configured as one if UL-PT-RS is configured. If a UE has reported the capability of supporting partial-coherent or non-coherent UL transmission, the number the PT-RS ports for a PUSCH repetition may be determined based on the indicated precoding matrix and/or number of layers. Since PUSCH repetition to the same TRP may use the same precoding matrix, the number of the PT-RS ports for each PUSCH repetition to the same TRP is the same.

In such embodiments, in order to ensure the same number of PT-RS ports between different TRPs, the BS may set the values of different TMPI fields such that the precoding matrix indicated by different TPMI fields is associated with the same number of PT-RS ports in addition to being associated with same number of layers (which has been agreed in 3GPP standard documents). Consequently, after receiving the TMPI fields, the UE may determine that the PT-RS ports between the different TRPs are the same.

Taking FIG. 2 as an example, it is assumed that: the BS transmits DCI format 0_1 which schedules PUSCH repetition(s) towards TRP #1 and TRP #2, the PUSCH repetition(s) are configured to be codebook based PUSCH repetition(s) by a higher layer parameter from the BS; two SRS resource sets (e.g., SRS resource set #1 and SRS resource set #2) for codebook based PUSCH transmission are configured for the UE, and the number of SRS ports (or PUSCH antenna ports) of the two SRS resource sets is four (e.g., SRS port #0, SRS port #1, SRS port #2, and SRS port #3); Besides, the number of layers of the each PUSCH repetition is two (e.g., layer #0 and layer #1); in addition, the maximum number of PT-RS ports is configured as two and the UE is capability of supporting partial-coherent transmission.

Table 1 shown below contains the precoding matrix used for two-layer PUSCH transmission with four SRS ports, which is the same as Table 6.3.1.5-5 in TS 38.211. Referring to table 1, each precoding matrix may be indicated by a TMPI index. For each precoding matrix, each row may correspond to an SRS port of the four SRS ports, respectively, for example, the first row may associate with SRS port #0, the second row may associate with SRS port #1, the third row may associate with SRS port #2, and the fourth row may associate with SRS port #3; each column may correspond to a layer of each PUSCH repetition, for example, the first column may associate with layer #0, the second column may associate with layer #1. Table 1 provides merely an exemplary embodiment for determining the precoding matrices. That is, different precoding matrices may be used based on the present disclosure and are not limited to those shown in Table 1.

TABLE 1

Precoding matrix for two-layer transmission using four SRS ports

| TPMI index | W (ordered from left to right in increasing order of TPMI index) | | | |
|---|---|---|---|---|
| 0-3 | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ | $\frac{1}{2}\begin{bmatrix}1&0\\0&1\\-j&0\\0&-1\end{bmatrix}$ | $\frac{1}{2}\begin{bmatrix}1&0\\0&1\\-1&0\\0&-j\end{bmatrix}$ | $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ | $\frac{1}{2}\begin{bmatrix}1&0\\0&1\\j&0\\0&-1\end{bmatrix}$ | $\frac{1}{2\sqrt{2}}\begin{bmatrix}1&1\\1&1\\1&-1\\1&-1\end{bmatrix}$ | $\frac{1}{2\sqrt{2}}\begin{bmatrix}1&1\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}$ | $\frac{1}{2\sqrt{2}}\begin{bmatrix}1&1\\j&j\\j&-j\\-1&1\end{bmatrix}$ | $\frac{1}{2\sqrt{2}}\begin{bmatrix}1&1\\-1&-1\\1&-1\\-1&1\end{bmatrix}$ | $\frac{1}{2\sqrt{2}}\begin{bmatrix}1&1\\-1&-1\\j&-j\\-j&j\end{bmatrix}$ |
| 20-21 | $\frac{1}{2\sqrt{2}}\begin{bmatrix}1&1\\-j&-j\\1&-1\\-j&j\end{bmatrix}$ | $\frac{1}{2\sqrt{2}}\begin{bmatrix}1&1\\-j&-j\\j&-j\\1&-1\end{bmatrix}$ | — | — |

The UE is capability of supporting partial-coherent transmission. As specified in 3GPP standard documents, partial-coherent transmission means that SRS antenna port 0 and SRS antenna port 2 share the same PT-RS port 0 and that SRS antenna port 1 and SRS antenna port 3 share the same PT-RS port 1. That is, based on a precoding matrix and the coherent type, the UE may determine the number of the PT-RS ports for the precoding matrix. Assuming that SRS port #0 in the embodiments of the subject application is associated with SRS antenna port 0 as specified in 3GPP standard documents, SRS port #1 in the embodiments of the subject application is associated with SRS antenna port 1 as specified in 3GPP standard documents, SRS port #2 in the embodiments of the subject application is associated with SRS antenna port 2 as specified in 3GPP standard documents, and SRS port #3 in the embodiments of the subject application is associated with SRS antenna port 3 as specified in 3GPP standard documents. Then, SRS port #0 and SRS port #2 share the same PT-RS port #0, and SRS port #1 and SRS port #3 share the same PT-RS port #1. For example, for the precoding matrix indicated by TPMI index 0, the number of PT-RS ports associated with it is two because SRS port #0 and SRS port #1 associated with PT-RS port #0 and PT-RS port #1, respectively.

Given the above, in order to ensure the same number of PT-RS ports between the two different TRPs, the BS may transmit two TPMI fields, wherein each TPMI field may be associated with a corresponding TRP and may indicate a TPMI index indicating a precoding matrix used for the PUSCH repetition to the corresponding TRP. Since the UE is capability of supporting partial-coherent transmission, the BS may indicate the precoding matrix with TPMI index from 0 to 13 to the UE. The BS should make sure that the precoding matrix indicated by different TPMI fields is associated with the same number of PT-RS ports.

For example, if a TPMI field for TRP #1 (or SRS resource set #1) indicates a TPMI index which equals to 1, the precoding matrix indicated by TPMI index 1 for TRP #1 may be associated with one PT-RS port. In order to ensure the same numbers of PT-RS ports between TRP #1 and TRP #2, another TPMI field for TRP #2 (or SRS resource set #2) should indicate a TPMI index which equals to 1 or 4 because only the precoding matrix indicated by TPMI index 1 or TPMI index 4 may be associated with one PT-RS port.

In another example, if a TPMI field for TRP #1 (or SRS resource set #1) indicates a TPMI index which equals to 0, the precoding matrix indicated by TPMI index 0 for TRP #1 may be associated with two PT-RS ports. In order to ensure the same numbers of PT-RS ports between TRP #1 and TRP #2, another TPMI field for TRP #2 (or SRS resource set #2) should indicate any TPMI index from 0 to 13 except for TPMI index 1 and TPMI index 4 because the precoding matrix indicated by other TPMI index from 0 to 13 except for TPMI index 1 and TPMI index 4 is associated with two PT-RS ports.

According to another embodiment of the present application, for non-codebook based PUSCH repetition, the BS may indicate or configure SRI fields such that the indicated SRS resources by different SRI fields for different TRPs are associated with the same number of PT-RS ports.

Specifically, in the case that the PUSCH repetition is a non-codebook based PUSCH repetition, the BS may transmit DCI or a CG configuration including a plurality of SRI fields. Consequently, the UE may receive the DCI or the CG configuration including the plurality of SRI fields.

In some embodiments, the PUSCH repetition(s) may be dynamically scheduled by UL grant in DCI, then the SRI fields may be included in the DCI. In some other embodiments, the PUSCH repetition(s) may correspond to a CG type 1 or CG type 2 as specified in 3GPP standard documents. In the case that the PUSCH repetition(s) corresponds to the CG type 1, the SRI fields may be included in a CG configuration for CG type 1. In the case that the PUSCH repetition(s) corresponds to the CG type 2, the SRI fields may be included in DCI activating the configured grant of CG type 2.

Each SRI field may indicate one or more SRS resources in an SRS resource set of the plurality of SRS resource set. That is, each SRI field may be associated with an SRS resource set. Since each SRS resource set is associated with a TRP, each SRI field may also be associated with a TRP. Each SRI field may indicate the one or more SRS resources in an SRS resource set for at least one PUSCH repetition associated with the corresponding SRS resource set (or the corresponding TRP). In fact, the one or more resources may be used for all of the repetitions associated with the corresponding SRS resource set (or the corresponding TRP).

Taking FIG. 2 as an example, the BS may transmit DCI or a CG configuration including two SRI fields (e.g., SRI field #1 and SRI field #2), and the UE may receive the DCI or the CG configuration including two SRI fields. Each SRI field may be associated with an SRS resource set (or a TRP), for example, SRI field #1 may be associated with SRS resource set #1 (or TRP #1) and SRI field #2 may be associated with SRS resource set #2 (or TRP #2). SRI field #1 may indicate one or more SRS resources in SRS resource set #1 for at least one PUSCH repetition associated with SRS resource set #1 (or TRP #1) and SRI field #2 may indicate one or more SRS resources in SRS resource set #2 for at least one PUSCH repetition associated with SRS resource set #2 (or TRP #2).

For the non-codebook based PUSCH repetition, each SRS resource may be configured with a PT-RS port index. For example, as specified in 3GPP standard documents, a UE is configured with the PT-RS port index for each configured SRS resource by a higher layer parameter PT-RS-PortIndex in SRS-Config as specified in 3GPP standard documents. Therefore, the number the PT-RS ports for a PUSCH repetition may be determined based on the indicated one or more SRS resources for the PUSCH repetition. Since at least one PUSCH repetition to the same TRP may use the same SRS resource(s), the number the PT-RS ports for each PUSCH repetition to the same TRP is the same.

In such embodiments, in order to ensure the same number of PT-RS ports between different TRPs, the BS may set the values of different SRI fields such that the one or more SRS resources indicated by different SRI fields is associated with the same number of PT-RS ports. Consequently, after receiving the SRI fields, the UE may determine that the PT-RS ports between the different TRPs are the same.

Taking FIG. 2 as an example, it is assumed that: the BS transmits a DCI which schedules PUSCH repetition(s) towards TRP #1 and TRP #2, the PUSCH repetition(s) are configured to be non-codebook based PUSCH repetition(s) by a higher layer parameter from the BS; two SRS resource sets (e.g., SRS resource set #1 and SRS resource set #2) for non-codebook PUSCH transmission are configured for the UE; and the maximum number of PT-RS ports is configured as two (e.g., PT-RS port #0 and PT-RS port #1).

It is also assumed that: SRS resource set #1 includes four SRS resources numbered as SRS resource #0, SRS resource #1, SRS resource #2, and SRS resource #3, wherein SRS resource #0 and SRS resource #1 in the SRS resource set #1 is configured with the PT-RS port index #0, and SRS resource #2 and SRS resource #3 in the SRS resource set #1 is configured with the PT-RS port index #1; SRS resource set #2 includes four SRS resources numbered as SRS resource #0, SRS resource #1, SRS resource #2, and SRS resource #3, wherein SRS resource #0 and SRS resource #1 in the SRS resource set #2 is also configured with the PT-RS port index #0, and SRS resource #2 and SRS resource #3 in the SRS resource set #2 is configured with the PT-RS port index #1.

Table 2 shown below illustrates the SRIs for non-codebook based PUSCH transmission for maximum four-layer PUSCH transmission, which is the same as Table 7.3.1.1.2-31 in TS 38.212. Referring to table 2, each SRI field may indicate at least one SRI for at least one SRS resource. Table 2 provides merely an exemplary embodiment for determining the SRI. That is, different SRIs may be used based on the present disclosure and are not limited to those shown in Table 2.

TABLE 2

| SRI for non-codebook based PUSCH transmission, $L_{max}$ = 4 | | | | | |
|---|---|---|---|---|---|
| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
| 0 | 0 | 0 | 0 | 0 | 0 |
| 1 | 1 | 1 | 1 | 1 | 1 |
| 2 | 0, 1 | 2 | 2 | 2 | 2 |
| 3 | Reserved | 3 | 0, 1 | 3 | 3 |
| | | 4 | 0, 2 | 4 | 0, 1 |
| | | 5 | 1, 2 | 5 | 0, 2 |
| | | 6 | 0, 1, 2 | 6 | 0, 3 |
| | | 7 | Reserved | 7 | 1, 2 |
| | | | | 8 | 1, 3 |
| | | | | 9 | 2, 3 |
| | | | | 10 | 0, 1, 2 |
| | | | | 11 | 0, 1, 3 |
| | | | | 12 | 0, 2, 3 |
| | | | | 13 | 1, 2, 3 |
| | | | | 14 | 0, 1, 2, 3 |
| | | | | 15 | Reserved |

Given the above, in order to ensure the same number of PT-RS ports between the two different TRPs, the BS may transmit two SRI fields, wherein each SRI field may be associated with a corresponding TRP and may indicate one or more SRS resources used for the corresponding TRP. The BS should make sure that the one or more SRS resources indicated by different SRI fields are associated with the same number of PT-RS ports.

For example, if the value of an SRI field for TRP #1 (or SRS resource set #1) equals to 4 in the fifth column, the one or more SRS resources indicated by the SRI field for TRP #1 may be SRS resource #0 and SRS resource #1. As stated above, SRS resource #0 and SRS resource #1 are associated with one PT-RS port since a sane PT-RS port index #0 is configured for both SRS resource #0 and SRS resource #1. It has been agreed in the 3GPP standard documents that the number of layers between two TRPs should be same, an thus the value of another SRI field for TRP #2 (or SRS resource set #2) should equal from 4 to 9 in the fifth column that associates with two SRI index.

In order to ensure the same numbers of PT-RS ports between TRP #1 and TRP #2, the value of another SRI field for TRP #2 (or SRS resource set #2) should equals 4 or 9 because the two SRS resources indicated by the fifth or tenth entry are associated with one PT-RS port.

In another example, if the value of an SRI field for TRP #1 (or SRS resource set #1) equals to 5 in the fifth column, the two SRS resources indicated by the SRI field for TRP #1 may be associated with two PT-RS ports since a different PT-RS port index #0 and PT-RS port index #1 is configured for SRS resource #0 and SRS resource #1 respectively. In order to ensure the same numbers of PT-RS ports between TRP #1 and TRP #2, the value of another SRI field for TRP #2 (or SRS resource set #2) should include any value from 5 to 8 in the fifth column because the two SRS resources indicated by them are associated with two PT-RS ports.

In such embodiments, after determining the same number of PT-RS ports for each PUSCH repetition, at step 304, the UE may transmit two or more PUSCH repetitions, which includes at least one PUSCH repetition towards each TRP.

The UE may determine a size of a TB of each PUSCH repetition of the two or more PUSCH repetitions based on the same number of PT-RS ports. Alternatively or additionally, the UE may also determine a PUSCH to PT-RS power ratio of each PT-RS transmission to different TRPs based on the same number of PT-RS ports.

Consequently, at step 305, the BS may receive the two or more PUSCH repetitions, wherein a size of a TB of each PUSCH repetition of the two or more PUSCH repetitions is determined based on the same number of PT-RS ports.

Although ensuring the same number of PT-RS ports between different TRPs by the BS may solve the issues, it limits the BS's flexibility because in some cases the available precoding matrix indexes or the values of the SRI field(s) could be selected from only one or two values.

According to some other embodiments of the present application, the BS may not ensure the same number of PT-RS ports between different TRPs. In such embodiments, the numbers of the PT-RS ports between different TRPs may be different.

For example, in the case that the PUSCH repetition is a codebook based PUSCH repetition, the BS may still transmit DCI or a CG configuration including a plurality of TPMI fields. Consequently, the UE may receive the DCI or the CG configuration including the plurality of TPMI fields.

Each TPMI field may be associated with an SRS resource set (or a TRP). Each TPMI field may indicate a TPMI index indicating a precoding matrix for a PUSCH repetition associated with the corresponding SRS resource set (or the corresponding TRP). For the codebook based PUSCH repetition, the number the PT-RS ports for a PUSCH repetition may be determined based on the indicated precoding matrix and a UE's capability of supporting of full-coherent or partial-coherent or a non-coherent PUSCH transmission.

In some cases, the BS does not ensure the same number of PT-RS ports, for different TRPs, thus the numbers of PT-RS ports may be different. Taking FIG. 2 together with table 1 as an example, TPMI field #1 associated with SRS resource set #1 (in other words, TRP #1) may include TPMI index 0, and the precoding matrix indicated by TPMI index 0 is associated with two PT-RS ports, whereas TPMI field #2 associated with SRS resource set #2 (in other words, TRP #2) may include TPMI index 1, and the precoding matrix indicated by TPMI index 1 is associated with one PT-RS port. Therefore, the number of PT-RS ports for different TRPs may be different.

In another example, in the case that the PUSCH repetition is a non-codebook based PUSCH repetition, the BS may still transmit DCI or a CG configuration including a plurality of SRI fields. Consequently, the UE may receive the DCI or the CG configuration including the plurality of SRI fields.

Each SRI field may indicate one or more SRS resource in a corresponding SRS resource set (or the corresponding TRP). Each SRI field may indicate one or more SRS resources in the corresponding SRS resource set for a PUSCH repetition associated with the corresponding SRS resource set (or the corresponding TRP). For the non-codebook based PUSCH repetition, the number the PT-RS ports for a PUSCH repetition may be determined based on the indicated one or more SRS resources.

Since the BS does not ensure the same number of PT-RS ports, for different TRPs, the number of PT-RS ports may be different. Taking FIG. 2 together with table 2 as an example, the value of SRI field #1 associated with SRS resource set #1 (in other words, TRP #1) equals 4 in the fifth column, and the two SRS resources #0 and #1 indicated by the SRI field #1 is associated with one PT-RS port, whereas the value of SRI field #2 associated with SRS resource set #2 (in other words, TRP #2) may equal 5 in the fifth column, and the two SRS resources #0 and #2 indicated by the SRI field #2 is associated with two PT-RS ports. Therefore, the number of PT-RS ports for different TRPs may be different.

That is, for codebook based PUSCH repetitions or non-codebook based PUSCH repetitions, the UE may determine that the numbers of PT-RS ports for PUSCH repetitions associated with different SRS resource sets (in other words, different TRPs) are different.

As stated above, since the numbers of PT-RS ports for PUSCH repetitions towards different TRPs are different, the available REs for PUSCH repetitions are different for different TRPs, which will result in a different TB size of the PUSCH repetitions. However, different PUSCH repetitions is for transmitting a same TB and the different PUSCH repetitions may be decoded by combination, and thus the same TB size should be ensured. In order to solve the above problem, when the numbers of PT-RS ports for PUSCH repetitions towards different TRPs are different, the UE may determine a size of a TB of each PUSCH repetition based on a maximum number of PT-RS ports among all the PUSCH repetitions. In other words, the UE may determine a size of a TB of each PUSCH repetition based on a maximum number of PT-RS ports determined from the one or more precoding matrices indicated by one or more TPMI fields for codebook based PUSCH repetition or one or more SRS resources indicated by one or more SRI fields for non-codebook based PUSCH repetition.

Taking FIG. 2 together with table 2 as an example, when the UE determines that the number of PT-RS ports for at least one PUSCH repetition associated with an SRS resource set #1 (in other words, TRP #1) is one (e.g., PT-RS port #0), and the number of PT-RS ports for the other at least one PUSCH repetition associated with SRS resource set #2 (in other words, TRP #2) is two (e.g., PT-RS port #0 and PT-RS port #1), for the at least one PUSCH repetition associated with one PT-RS port for TRP #1, the UE may transmit the PT-RS using the one PT-RS port (e.g., PT-RS port #0) and muting the other PT-RS port (e.g., PT-RS port #1). That is the UE does not transmit other signals or data on the REs corresponding to the other PT-RS port (e.g., PT-RS port #1). The UE may also determine the size of the TB for each PUSCH repetition to TRP #1 and TRP #2 based on the two PT-RS ports.

In addition, as specified in 3GPP standard documents, the PUSCH power is relative to the PT-RS power by a ratio. Based on the ratio, the UE may determine the PT-RS transmission power. For example, table 3 shown below illustrates the factors related to PUSCH to PT-RS power ratio per layer per RE $$\left(\text{i.e., } \alpha_{PTRS}^{PUSCH}\right),$$

which is the same as Table 6.2.3.1-3 in TS 38.214 Referring to table 3, the factors may include the coherent type, the number of the PUSCH layer, and $Q_p$, wherein Qp is the number of PT-RS ports used for the corresponding PUSCH repetition.

TABLE 3

| factors related to PUSCH to PT-RS power ratio per layer per RE $\alpha_{PTRS}^{PUSCH}$ | | | | | | | | |
|---|---|---|---|---|---|---|---|---|
| | The number of PUSCH layers ($n_{layer}^{PUSCH}$) | | | | | | | |
| | | 2 | | 3 | | 4 | | |
| UL-PT-RS-power/ $\alpha_{PTRS}^{PUSCH}$ | 1 All cases | Full coherent | Partial and non-coherent and non-codebook based | Full coherent | Partial and non-coherent and non-codebook based | Full coherent | Partial coherent | Non-coherent and non-codebook based |
| 00 | 0 | 3 | $3Q_p$-3 | 4.77 | $3Q_p$-3 | 6 | $3Q_p$ | $3Q_p$-3 |
| 01 | 0 | 3 | 3 | 4.77 | 4.77 | 6 | 6 | 6 |
| 10 | Reserved | | | | | | | |
| 11 | Reserved | | | | | | | |

The above definition for Qp may be used for one-TRP transmission. As stated above, for multi-TRP transmission, the number of PT-RS ports determined for different TRPs may be different, and thus the PT-RS powers for different TRP may be different.

Taking FIG. 2 as an example, if one TRP uses one PT-RS port for transmitting the PT-RS, and the other TRP uses two PT-RS ports for transmitting the PT-RS, as stated above, the TB size of the PUSCH repetition is determined based on the two PT-RS ports. For the TRP which uses one PT-RS port for transmitting the PT-RS, the power of the unused REs due to using two PT-RS ports for transmitting the PT-RS for the other TRP may be used for the PT-RS with one PT-RS port transmission. In such situation, there is up to 3 dB power boosting to be achieved for PT-RS transmission by using one PT-RS port of one TRP, thereby achieving a better phase tracking performance.

When the numbers of PT-RS ports for PUSCH repetitions associated with different SRS resource sets are different, in order to achieve the power boosting for PT-RS transmission with a lower number of PT-RS port, the UE may determine a PT-RS power ratio (e.g., PUSCH to PT-RS power ratio per layer per $$RE\ \alpha_{PTRS}^{PUSCH}$$

in table 3) of each PUSCH repetition based on a maximum number of PT-RS ports among all the PUSCH repetitions.

Still taking FIG. 2 together with table 2 as an example, when the UE determines that the number of PT-RS ports for at least one PUSCH repetition associated with an SRS resource set #1 (in other words, TRP #1) is one (e.g., PT-RS port #0), and the number of PT-RS ports for the other at least one PUSCH repetition associated with SRS resource set #2 (in other words, TRP #2) is two (e.g., PT-RS port #0 and PT-RS port #1), for each PUSCH repetition to TRP #1 and TRP #2, when the uses table 3 to determine PUSCH to PT-RS power ratio per layer per RE, the Qp in table 3 should be redefined as the maximum number of PT-RS ports among all the PUSCH repetitions to TRP #1 and TRP #2, e.g., two PT-RS ports in this example. Then when the UE transmits PT-RS to TRP #1, the Qp equals two even though the number of PT-RS port determined for PT-RS transmission to TRP #1 is one.

In such embodiments, after determining the different numbers of PT-RS ports for each PUSCH repetition, at step 304, the UE may transmit two or more PUSCH repetitions. The two or more PUSCH repetitions may include at least one PUSCH repetition towards each TRP. The UE may determine a size of a TB of each PUSCH repetition of the two or more PUSCH repetitions based on a maximum number of PT-RS ports among the two or more PUSCH repetitions. Alternatively or additionally, the UE may also determine a PUSCH to PT-RS power ratio of each PT-RS transmission based on a maximum number of PT-RS ports among the two or more PUSCH repetitions.

Consequently, at step 305, the BS may receive the two or more PUSCH repetitions, wherein a size of a TB of each PUSCH repetition of the two or more PUSCH repetitions is determined based on a maximum number of PT-RS ports among the two or more PUSCH repetitions.

Figure 4:
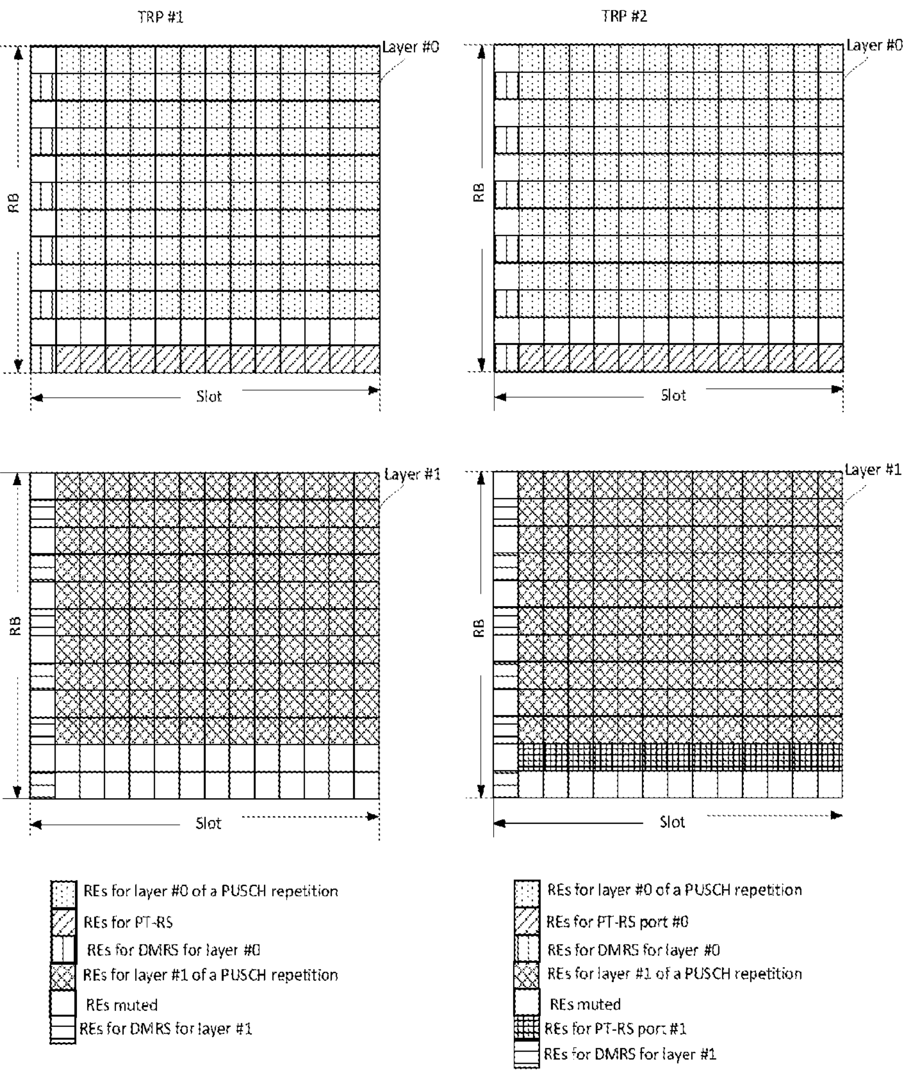
FIG. 4 illustrates an exemplary resource mapping of two-layer PUSCH repetition transmission towards multi-TRP according to some embodiments of the present application.

FIG. 4 illustrates an exemplary resource mapping of two-layer PUSCH transmission towards multi-TRP according to some embodiments of the present application. In the example of FIG. 4, different numbers of PT-RS ports are determined for PUSCH repetitions towards different TRPs.

In the example of FIG. 4, it is assumed that: the BS transmits a DCI which schedules PUSCH repetition(s) towards TRP #1 and TRP #2, the PUSCH repetition(s) are configured to be non-codebook based PUSCH repetition(s) by a higher layer parameter from the BS; two SRS resource sets (e.g., SRS resource set #1 and SRS resource set #2) used for non-codebook transmission are configured for the UE; and the maximum number of PT-RS ports is configured as two (e.g., PT-RS port #0 and PT-RS port #1).

It is also assumed that: SRS resource set #1 includes four SRS resources numbered as SRS resource #0, SRS resource #1, SRS resource #2, and SRS resource #3, wherein SRS resource #0 and SRS resource #1 in the SRS resource set #1 is configured with the PT-RS port index #0, and SRS resource #2 and SRS resource #3 in the SRS resource set #1 is configured with the PT-RS port index #1; SRS resource set #2 includes four SRS resources numbered as SRS resource #0, SRS resource #1, SRS resource #2, and SRS resource #3, wherein SRS resource #0 and SRS resource #1 in the SRS resource set #2 is also configured with the PT-RS port index #0, and SRS resource #2 and SRS resource #3 in the SRS resource set #2 is configured with the PT-RS port index #1.

In addition, it is assumed that the DCI includes two SRI fields (e.g., SRI field #1 and SRI field #2). SRI field #1 may be associated with SRS resource set #1 (or TRP #1) and SRI field #2 may be associated with SRS resource set #2 (or TRP #2). The value of SRI field #1 equals 4 in the fifth column in table 2 and the value of SRI field #2 equals 5 in the fifth column in table 2.

Then, the UE may assume the number of the layers of PUSCH repetition is 2. The UE may also determine that the number of PT-RS ports of the PUSCH repetition(s) toward TRP #1 is 1, and the number of PT-RS ports of the PUSCH repetition(s) toward TRP #2 is 2. Suppose that the DMRS ports indicated for the PUSCH transmission are in a code division multiplexing (CDM) group, which means the two DMRS ports for the two layers occupying same REs, then the two-layer non-codebook PUSCH repetition toward TRP #1 and TRP #2 may be illustrated as in FIG. 4.

Referring to FIG. 4, a PUSCH repetition for each TRP may have two layers (e.g., layer #0 and layer #1). The resource for each layer of the two layers may at least include a resource block (RB) in frequency domain and one or more symbols in time domain. Each RB may include a plurality of REs. For TRP #1, since the number of PT-RS ports used for the PUSCH repetition(s) to TRP #1 is one (e.g., PT-RS port #0), and suppose PT-RS port #0 is associated with DMRS port #0, the UE may transmit PT-RS in layer #0 using one PT-RS port (e.g., PT-RS port #0) to TRP #1. For TRP #2, since the number of PT-RS ports used for the PUSCH repetition(s) to TRP #2 is two, and suppose PT-RS port #0 is associated with DMRS port #0, PT-RS port #1 is associated with DMRS port #1, the UE may transmit PT-RS in layer #0 and layer #1 by using two PT-RS ports (e.g., PT-RS port #0 and PT-RS port #1) to TRP #2, respectively. As stated above, the TB size for each PUSCH repetition to TRP #1 and TRP #2 are determined based on the two PT-RS ports, and thus the REs in layer #1 of TRP #1 corresponding to the REs for PT-RS port #1 in layer #1 of TRP #2 are muted. The power of these muted REs can be used for transmitting PT-RS to TRP #0. In such situation, when the UE calculates the power of PT-RS transmission (e.g., PUSCH to PT-RS power ratio per layer per RE) towards TRP #0 using table 3, the number of PT-RS ports Qp in table 3 may be set to two.

Figure 5:
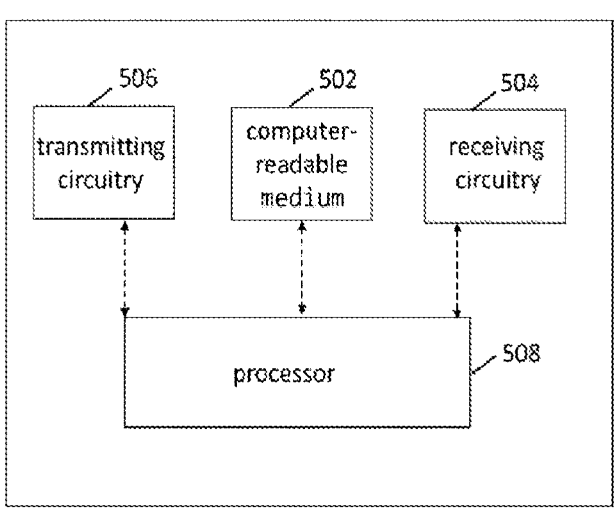
FIG. 5 illustrates a simplified block diagram of an apparatus for multi-TRP transmission according to some embodiments of the present application.

FIG. 5 illustrates a simplified block diagram of an apparatus for multi-TRP transmission according to some embodiments of the present application. The apparatus 500 may be a BS 101 or a UE 105 (for example, UE 105*a*, UE 105*b*, or UE 105*c*) as shown in FIG. 1.

Referring to FIG. 5, the apparatus 500 may include at least one non-transitory computer-readable medium 502, at least one receiving circuitry 504, at least one transmitting circuitry 506, and at least one processor 508. In some embodiments of the present application, at least one receiving circuitry 504 and at least one transmitting circuitry 506 and be integrated into at least one transceiver. The at least one non-transitory computer-readable medium 502 may have computer executable instructions stored therein. The at least one processor 508 may be coupled to the at least one non-transitory computer-readable medium 502, the at least one receiving circuitry 504 and the at least one transmitting circuitry 506. The computer executable instructions can be programmed to implement a method with the at least one receiving circuitry 504, the at least one transmitting circuitry 506 and the at least one processor 508. The method can be a method according to an embodiment of the present application, for example, the method shown in FIG. 3.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for multi-TRP transmission, including a processor and a memory. Computer programmable instructions for implementing a method for multi-TRP transmission are stored in the memory, and the processor is configured to perform the computer programmable instructions to implement the method for multi-TRP transmission. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for multi-TRP transmission as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. A method, comprising:

receiving first configuration information for an uplink phase tracking reference signal (PT-RS) and second configuration information indicating a plurality of sounding reference signal (SRS) resource sets, each of the plurality of SRS resource sets being associated with at least one physical uplink shared channel (PUSCH) repetition;

for each PUSCH repetition, determining a number of PT-RS ports for transmitting the uplink PT-RS, wherein the numbers of PT-RS ports for PUSCH repetitions associated with different SRS resource sets are different;

transmitting two or more PUSCH repetitions; and determine a size of a transport block (TB) of each PUSCH repetition based on a maximum number of PT-RS ports among all of the two or more PUSCH repetitions.

2. The method of claim 1, wherein a same number of PT-RS ports for PUSCH repetitions is associated with different SRS resource sets.

3. The method of claim 2, wherein the PUSCH repetition is a codebook based PUSCH repetition, and the method further comprises:

receiving downlink control information (DCI) or a configured grant (CG) configuration including a plurality of transmitted precoding matrix indicator (TPMI) fields, wherein a TPMI indicated by each TPMI field is associated with one or more SRS resources in a corresponding SRS resource set of the plurality of SRS resource sets.

4. The method of claim 3, wherein each TPMI field indicates a precoding matrix for at least one PUSCH repetition associated with the corresponding SRS resource set, and wherein the precoding matrix indicated by different TPMI fields is associated with a same number of PT-RS ports.

5. The method of claim 2, wherein the PUSCH repetition is a non-codebook based PUSCH repetition, and the method further comprises:

receiving downlink control information (DCI) or a configured grant (CG) configuration including a plurality of SRS resource indicator (SRI) fields, wherein each SRI field indicates one or more SRS resources in a corresponding SRS resource set of the plurality of SRS resource sets.

6. The method of claim 5, wherein each SRI field indicates the one or more SRS resources used for at least one PUSCH repetition associated with the corresponding SRS resource set, and wherein the one or more SRS resources indicated by different SRI fields are associated with a same number of PT-RS ports.

7. The method of claim 1, further comprising:

determining a PT-RS power ratio of each PUSCH repetitions based on a maximum number of PT-RS ports among all of the two or more PUSCH repetitions.

8. A base station for wireless communication, comprising:

at least one memory; and at least one processor coupled with the at least one memory and configured to cause the base station to:

transmit first configuration information for an uplink phase tracking reference signal (PT-RS) and second configuration information indicating a plurality of sounding reference signal (SRS) resource sets, each of the plurality of SRS resource sets being associated with at least one physical uplink shared channel (PUSCH) repetition; and receive two or more PUSCH repetitions; and determine a size of a transport block (TB) of each PUSCH repetition based on a maximum number of PT-RS ports among all of the two or more PUSCH repetitions.

9. The base station of claim 8, wherein a same number of PT-RS ports for PUSCH repetitions is associated with different SRS resource sets.

10. The base station of claim 9, wherein the PUSCH repetition is a codebook based PUSCH repetition, and the at least one processor is configured to:

transmit downlink control information (DCI) or a configured grant (CG) configuration including a plurality of transmitted precoding matrix indicator (TPMI) fields, wherein a TPMI indicated by each TPMI field is associated with one or more SRS resources in a corresponding SRS resource set of the plurality of SRS resource set.

11. A user equipment (UE) for wireless communication, comprising:

at least one memory; and at least one processor coupled with the at least one memory and configured to cause the UE to:

receive first configuration information for an uplink phase tracking reference signal (PT-RS) and second configuration information indicating a plurality of sounding reference signal (SRS) resource sets, each of the plurality of SRS resource sets being associated with at least one physical uplink shared channel (PUSCH) repetition;

for each PUSCH repetition, determine a number of PT-RS ports for transmitting the uplink PT-RS, wherein the numbers of PT-RS ports for PUSCH repetitions associated with different SRS resource sets are different;

transmit two or more PUSCH repetitions; and determine a size of a transport block (TB) of each PUSCH repetition based on a maximum number of PT-RS ports among all of the two or more PUSCH repetitions.

12. The UE of claim 11, wherein a same number of PT-RS ports for PUSCH repetitions is associated with different SRS resource sets.

13. The UE of claim 12, wherein the PUSCH repetition is a codebook based PUSCH repetition, and the at least one processor is configured to cause the UE to:

receive downlink control information (DCI) or a configured grant (CG) configuration including a plurality of transmitted precoding matrix indicator (TPMI) fields, wherein a TPMI indicated by each TPMI field is associated with one or more SRS resources in a corresponding SRS resource set of the plurality of SRS resource sets.

14. The UE of claim 13, wherein each TPMI field indicates a precoding matrix for at least one PUSCH repetition associated with the corresponding SRS resource set, and wherein the precoding matrix indicated by different TPMI fields is associated with a same number of PT-RS ports.

15. The UE of claim 12, wherein the PUSCH repetition is a non-codebook based PUSCH repetition, and the at least one processor is configured to cause the UE to:

receive downlink control information (DCI) or a configured grant (CG) configuration including a plurality of SRS resource indicator (SRI) fields, wherein each SRI field indicates one or more SRS resources in a corresponding SRS resource set of the plurality of SRS resource sets.

16. The UE of claim 15, wherein each SRI field indicates the one or more SRS resources used for at least one PUSCH repetition associated with the corresponding SRS resource set, and wherein the one or more SRS resources indicated by different SRI fields are associated with a same number of PT-RS ports.

17. The UE of claim 11, wherein least one processor is configured to cause the UE to determine a PT-RS power ratio of each PUSCH repetitions based on a maximum number of PT-RS ports among all of the two or more PUSCH repetitions.

18. A method performed by a base station, the method comprising:

transmitting first configuration information for an uplink phase tracking reference signal (PT-RS) and second configuration information indicating a plurality of sounding reference signal (SRS) resource sets, each of the plurality of SRS resource sets being associated with at least one physical uplink shared channel (PUSCH) repetition; and receiving two or more PUSCH repetitions; and determining a size of a transport block (TB) of each PUSCH repetition based on a maximum number of PT-RS ports among all of the two or more PUSCH repetitions.

19. The method of claim 18, wherein a same number of PT-RS ports for PUSCH repetitions is associated with different SRS resource sets.

20. The method of claim 19, wherein the PUSCH repetition is a codebook based PUSCH repetition, and the method further comprises:

transmitting downlink control information (DCI) or a configured grant (CG) configuration including a plurality of transmitted precoding matrix indicator (TPMI) fields, wherein a TPMI indicated by each TPMI field is associated with one or more SRS resources in a corresponding SRS resource set of the plurality of SRS resource set.

* * * * *